June 27, 1950 — H. L. ARNEST — 2,513,130
TRAP ANCHORING AND ANIMAL DROWNING STAKE
Filed April 18, 1949

Inventor
Harry L. Arnest
By Shepherd & Campbell
Attorneys

Patented June 27, 1950

2,513,130

UNITED STATES PATENT OFFICE 2,513,130

TRAP ANCHORING AND ANIMAL DROWNING STAKE

Harry L. Arnest, Arlington, Va.

Application April 18, 1949, Serial No. 88,149

1 Claim. (Cl. 43—96)

This invention relates to improvements in devices to which animal traps may be attached and, in its particular aspects, relates to anchoring and animal drowning stakes for traps or the like adapted primarily for amphibious animals.

An object of the invention is to provide a stake which may be readily driven into the ground, usually the bed of a stream, lake or other body of water, and secured in such position, the stake being adapted to receive the ring ordinarily carried by the chain secured to an animal trap whereby to anchor the trap in its selected location.

A further object of the invention is to provide a trap anchoring stake which is constructed and arranged in such a manner as to induce the drowning of the animal after it has become caught in the trap thereby to prevent escape of the animal by pulling free of the trap or by gnawing off the trapped limp as commonly occurs.

Still another object of the invention is to provide a combined trap anchoring and animal drowning stake which is exceedingly simple in construction and extremely durable and efficient in operation.

Other and further objects and advantages of the invention will be apparent from the following detailed description taken in conjunction with the accompanying drawings wherein a preferred embodiment of the principles of the invention has been selected for exemplification.

Figure 1:
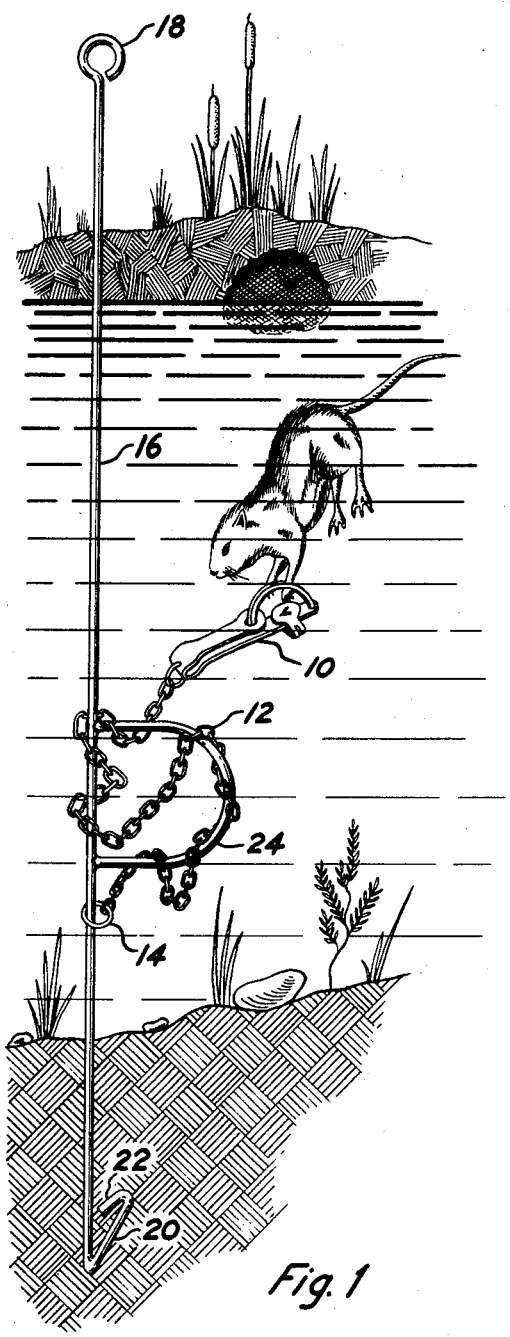
Fig. 1 is a side elevational view of a device constructed in accordance with the invention and illustrating the operation of the device to induce drowning of the trapped animal.
Figure 2:
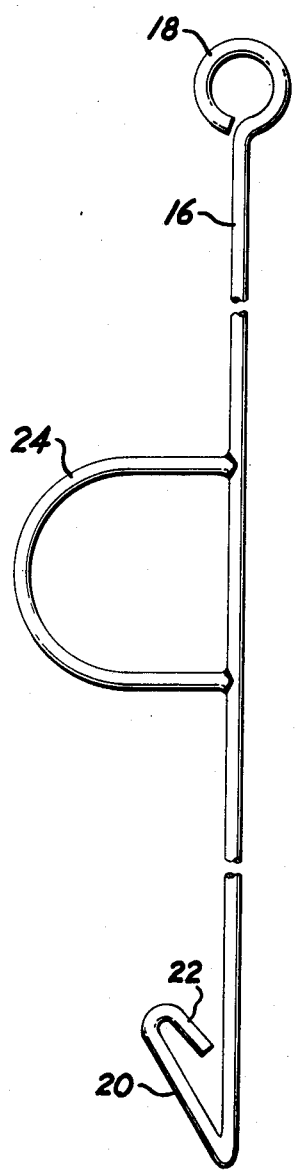
Fig. 2 is an enlarged side elevational view partly broken away of the device shown in Fig. 1.

Referring more particularly to the drawings wherein like numerals refer to like parts, the trap indicated at 10 may be of any ordinary construction and, as usual, carries a securing chain 12 terminating at its free end in a ring 14.

The stake comprising the present invention indicated in its entirety at 16 may be formed of any suitable material such as a relatively rigid metallic rod, capable of receiving the ring 14.

For convenience in extracting the stake 16 from the ground in which it is imbedded, the upper extremity of the stake is provided with a projecting member such as the integral eye 18 shown. For anchoring the stake 16 in the ground, the lower end 20 thereof is bent at an acute angle to the body of the stake and the extremity 22 thereof turned inwardly toward the stake but terminating short thereof for a purpose hereinafter to be explained.

For inducing the drowning of the animal after it has been caught in the trap 10 there is provided at an intermediate portion of the stake a loop 24, preferably integral therewith as shown. In accordance with an important feature of the invention the loop 24 is of a critical minimum width sufficient to permit the body of the animal and the trap 10 to pass therethrough. It is well known that amphibious animals when trapped plunge into the water and, in the operation of the present invention, the animal invariably will encircle the stake 16 swimming repeatedly through the loop 24. The chain 12 eventually becomes entangled around the stake 16 and loop 24, such as indicated in Fig. 1, so that the animal will be prevented from again moving the trap to the bank and extricating itself by gnawing off its legs. This provision of the rigid, laterally extending loop 24 has the novel advantage that as the animal, in seeking to escape, repeatedly engages the chain with loop and stake it has the effect of continually shortening the chain with the result that an animal can be drowned in much shallower water than would be the case if such shortening of the chain did not take place. It will be seen that the stake and loop together define an open frame having continuous sides, which frame lies, substantially in the transverse plane of the stake.

The particular width and diameter of the loop 24 will vary in accordance with the specie of animal being hunted and naturally a larger loop will be provided for a racoon, otter or beaver than for a muskrat, mink or marten, the essential thing, however, being that the loop 24 have a size sufficient to permit the passage of the body of the animal and the trap with which it is engaged. For most purposes, a loop having an inside width or diameter of about six to ten inches, preferably about eight inches will be adequate.

The operation of the device will be readily apparent particularly from inspection of Fig. 1, it being understood that the trap 10 is initially set and placed upon the bank of the stream. The ring 14 of the chain 12 is then passed through the space between the extremity 22 and the body of stake 16 and pulled upwardly along the stake to a point just below the loop 24. The lower end of the stake may then be driven into the stream bottom so that the loop 24 lies beneath the surface of the water, as shown. As explained above, the animal when caught in the trap will plunge into the water and in its frantic efforts to escape inevitably will entangle the chain 12 about the loop 24 so that being unable to reach the surface of the water the animal will drown.

The animal as well as the trap and chain may be readily recovered without the necessity of reaching beneath the surface of the water merely by grasping the eye 18 and pulling upwardly, it being apparent that the pocket formed by the lower end 22 of the stake will receive the ring 14 to insure retrievement of the trap and the animal engaged thereby. The trap and the stake 16 may be easily disconnected when not in use by merely pulling the ring 14 off the end of extremity 22.

It will be understood that the present invention is not confined to the precise construction herein shown and described but embraces such modified structure and arrangement of parts as come within the scope of the following claim.

I claim:

A trap anchor and animal drowning device for attachment to the chain ring of a chain attached to an animal trap which comprises, a stake insertible through the chain ring and a relatively enlarged loop having portions rigidly secured to an intermediate portion of said stake to define therewith an open frame with continuous sides for limiting the upward movement of the chain ring along said stake, the opening of said frame being of an inside width at least as great as the widths of the body of the animal and the trap whereby to permit passage of the animal and the trap through the frame to entangle the chain, and the loop and stake being in the same plane.

HARRY L. ARNEST.

REFERENCES CITED

The following references are of record in the file of this patent:

UNITED STATES PATENTS

| Number | Name | Date |
|---|---|---|
| 1,030,165 | Crites | June 18, 1912 |
| 1,309,036 | Knight | July 8, 1919 |
| 2,471,804 | Wheeler | May 31, 1949 |